(12) United States Patent
Bradley et al.

(10) Patent No.: US 10,816,747 B2
(45) Date of Patent: Oct. 27, 2020

(54) INSTALLATION OF SMALL FORM FACTOR FIBERS AT USER PREMISES

(71) Applicant: OFS Fitel, LLC, Norcross, GA (US)

(72) Inventors: Kelvin B Bradley, Lawrenceville, GA (US); Xavier Chiron, Curitiba (BR)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 16/432,270

(22) Filed: Jun. 5, 2019

(65) Prior Publication Data

US 2020/0292774 A1  Sep. 17, 2020

Related U.S. Application Data

(63) Continuation-in-part of application No. 16/366,541, filed on Mar. 27, 2019.

(60) Provisional application No. 62/816,506, filed on Mar. 11, 2019.

(51) Int. Cl.
  *G02B 6/46* (2006.01)
  *B05C 17/005* (2006.01)

(52) U.S. Cl.
  CPC ............ *G02B 6/46* (2013.01); *B05C 17/0052* (2013.01); *B05C 17/00593* (2013.01)

(58) Field of Classification Search
  USPC ........................................................ 156/578
  See application file for complete search history.

(56) References Cited

U.S. PATENT DOCUMENTS

| | | | |
|---|---|---|---|
| 10,259,006 B2 * | 4/2019 | Bradley | ............ B05C 17/00576 |
| 10,302,887 B1 * | 5/2019 | Bradley | ............... G02B 6/4466 |
| 2018/0345313 A1 * | 12/2018 | Bradley | ............ B05C 17/00583 |
| 2018/0348465 A1 * | 12/2018 | Bradley | ............... G02B 6/4466 |
| 2019/0179095 A1 * | 6/2019 | Bradley | ................... G02B 6/46 |
| 2020/0158979 A1 * | 5/2020 | Bradley | ................... G02B 6/54 |

* cited by examiner

*Primary Examiner* — Sing P Chan
(74) *Attorney, Agent, or Firm* — Law Offices of Leo Zucker, Esq.

(57) ABSTRACT

A guide tool device for an optical fiber includes a body having an adhesive passage between a proximal end and a flat distal end of the body. The passage communicates an adhesive supplied at the proximal end to an exit opening in the distal end. Each of a pair of fiber guide channels extends from the body to guide an optical fiber when aligned inside the channel, for relative movement over the exit opening in the distal end of the body during use of the device. A connector fixed on the proximal end of the body in communication with the passage, mates with a connector at the distal end of a syringe containing the adhesive. When urged by the syringe, the adhesive flows through the passage and out the exit opening in the distal end of the body, thereby coating the fiber when guided over the distal end during use.

20 Claims, 9 Drawing Sheets

INSTALLATION OF SMALL FORM FACTOR FIBERS AT USER PREMISES

CROSS REFERENCE TO RELATED APPLICATIONS

The present application claims priority under 35 U.S.C. § 119(e) of Provisional Patent Application No. 62/816,506 filed Mar. 11, 2019, titled Tool Device and Method for Installing Small-Form-Factor Fibers at User Premises, the entire contents of which are incorporated by reference.

This application is also a continuation-in-part (CIP) under 35 U.S.C. § 120 of copending U.S. patent application Ser. No. 16/366,541 filed Mar. 27, 2019, and titled Installation of Small Form Factor Fibers at User Premises.

BACKGROUND OF THE INVENTION

Field of the Invention

The present invention concerns methods and tools for routing and installing an optical fiber inside the premises of fiber optic network users.

Discussion of the Known Art

Desktop optical network terminals (ONTs) are being deployed at an increasing rate inside the premises of fiber optic network users. ONTs are usually placed on a desk or shelf inside the premises near a TV set top box, cable modem, or other electronic device to which the ONT is connected so it can interface the device with the network.

As used herein, the term premises means a home, an office, an apartment, or other living unit where a user of a fiber optic network resides and uses services provided by the network, e.g., Internet access, telephony, television, voice and music broadcasts, and/or other information and data streams that require the routing and installation of one or more optical fibers inside the premises. Also, the terms fiber, optical fiber, and cord are used interchangeably herein to connote an optical fiber that is buffered and/or jacketed, as well as a fiber optic cable that contains one or more optical fibers.

Moreover, the term small form factor fiber as used herein refers to a fiber having an outside diameter (O.D.) between approximately 400 µm and 700 µm. For example, a 20 meter length of spooled 600 µm O.D. buffered fiber, suitable for installation at user premises as described herein, is commercially available from OFS Fitel, LLC, as part No. 301147609.

Conventional staples can be used to secure a fiber to a wall, a wall molding, or other exposed and accessible structural surfaces at a premises, to minimize installation time and incur relatively low cost. Many users reject stapled installations, however, and opt instead for special moldings or conduits to conceal the fiber at their premises. Staples can also physically damage walls and moldings, and impair or break a fiber if not properly installed. Some users also prefer to hide all wires and fibers completely at their premises, thereby incurring expensive hardware with increased installation time.

Accordingly, a procedure that enables an installer to route and bond an optical fiber quickly, properly, and safely along structural surfaces, grooves, and/or corners inside user premises with little if any visibility, is very desirable. A solution offered by OFS Fitel, LLC, under the registered mark InvisiLight fulfills this need by providing fast, easy, and virtually invisible fiber installations using a consumer grade, low odor, nonhazardous, water based adhesive to bond optical fibers to walls and ceilings indoors. Water based adhesives are preferred since they are typically non-toxic, allow clean up with soap and water, and can be shipped worldwide without restriction. As demand for InvisiLight installations has spread, users have expressed a desire that the installation time be reduced even more by addressing the following concerns.

Currently, an installer must move and climb a ladder multiple times. First, he or she deposits an adhesive bead over successive elevated portions of the routing path by repositioning and climbing the ladder to reach the ceiling or molding at each portion, while at the same time holding onto an adhesive dispensing gun. To deposit the adhesive bead, the installer squeezes the gun trigger one or more times to cause a plunger inside the syringe to urge the adhesive out of an applicator nozzle.

Once the adhesive bead is deposited over the entire routing path, the installer repeats the first series of ladder movements, climbing the ladder again at each elevated portion of the path where the installer manually presses the fiber into the bead. At many premises, however, large furniture (e.g., sofas and entertainment centers) are located directly beneath elevated portions of the routing path, thus making it difficult for the installer to use the ladder safely at such locations.

FIG. 1 shows an extensible adhesive dispensing gun system that is disclosed in U.S. Patent Application Pub. No. 2018/0345313 (Dec. 6, 2018), and which application is assigned to the present applicant. The system enables an installer to apply an adhesive bead along ceilings and crown moldings while standing on the floor at the premises. The system includes an adhesive dispensing gun 12, an outer extension tube 14, an inner rod 16 extending axially inside the extension tube 14 with a plunger head at a distal end of the rod 16, a syringe adapter 18 at a distal end of the extension tube 14, and a syringe 20 having a piston 22 for dispensing an adhesive out of a syringe nozzle 24.

To apply an adhesive bead, the installer squeezes a trigger 26 on the gun 12 one or more times to cause a plunger 28 in the gun to advance against the inner rod 16 which, in turn, urges the piston 22 inside the syringe 20 to dispense the adhesive out of the nozzle 24. A plunger head at the end of the rod 16 applies uniform forward and outward pressure to a thin-walled, trailing end of the piston, 22 which helps to seal the piston against the inner wall of the syringe 20, thus ensuring a reliable and consistent application of an adhesive bead from the nozzle 24.

FIG. 2 shows a known cord guide tool 40 that is shown in FIG. 10 of U.S. Patent Application Pub. No. 2018/0348465 (Dec. 6, 2018), and which application is also assigned to the present applicant. As seen in FIG. 3 of the present application, when attached to a distal end of the syringe 20 in the extensible dispensing gun system 10 in FIG. 1, the guide tool 40 enables an installer to embed a fiber neatly and precisely into the adhesive deposited by the system 10 near a ceiling without a ladder. The guide tool 40 has a flat leading edge 42 sized so that when urged across a corner between, e.g., adjacent walls, a wall and a ceiling, or a wall and a molding, the space formed between the leading edge 42 and the corner is relatively small. While the adhesive is being deposited along the corner and a fiber is oriented to pass between the leading edge 42 of the guide tool 40 and the corner, the guide tool embeds the fiber in the adhesive.

U.S. Pat. No. 9,835,817 (Dec. 5, 2017), also assigned to the present applicant and incorporated herein by reference, describes a tool for embedding an optical fiber in an adhesive that has been deposited along a structural corner in a building room or hallway, without a ladder. The patented tool has a trough for receiving and containing a fiber, a guide channel at a downstream end of the trough arranged to retain the fiber, and a nose at a downstream end of the channel for embedding the fiber in the adhesive when an installer uses a pole to sweep the tool nose over and against the adhesive.

To facilitate an even faster installation while minimizing ladder use, several problems need to be solved. First, an extensible adhesive dispensing gun system like the system 10 in FIG. 1 is required to eliminate the need for a ladder during adhesive application. Also required is a device that allows the fiber to be positioned along the routing path at the same time the adhesive is being deposited, thereby eliminating the need for an installer to traverse the routing path twice (i.e., first to deposit the adhesive, and again to embed the fiber in the adhesive). Finally, a small form factor fiber is needed that is light enough to stay embedded in an uncured adhesive deposit, and which will not peel out of the deposit when the weight of an adjacent length of the fiber is left to hang freely to the floor before it is installed.

For example, an uninstalled length of fiber may be left hanging if the installer pauses before completing an installation due to unplanned interruptions such as, e.g., restroom breaks, phone calls, and the like. A typical floor-to-ceiling height in a user premises is eight feet. On average, the weight of a conventional 900 μm O.D. buffered fiber which is often used in fiber installations at user premises, is $6.2 \times 10^{-4}$ lb/ft. This can result in a downward peel force of approximately 0.005 lb being applied by a freely hanging uninstalled fiber, to the end of an adjacent length of fiber that is embedded in a yet uncured adhesive deposit. If the uncured adhesive cannot overcome the force, the embedded fiber will peel out of the adhesive unless secured by tape at one or more locations.

SUMMARY OF THE INVENTION

According to one aspect of the invention, a guide tool device for an optical fiber or cord includes a central body having an adhesive passage formed between a proximal end and a flat distal end of the body. The passage is configured for communicating an adhesive supplied at the proximal end to an exit opening in the distal end of the body. A pair of fiber guide channels extend from opposite sides of the central body. Each channel is inclined so that a distal edge of the channel is adjacent a side edge of the distal end of the body, and the channel is formed to guide an optical fiber aligned inside the channel for relative movement over the exit opening of the passage in the distal end of the body during use of the device.

A connector is fixed on the proximal end of the body in communication with the adhesive passage, and the connector is configured to mate with a connector at the distal end of a syringe containing the adhesive. Thus, when urged by the syringe, the adhesive flows through the passage and out the exit opening in the distal end of the body to coat the optical fiber when guided over the flat distal end during use.

According to another aspect of the invention, a guide tool device for an optical fiber or cord includes a central body having an adhesive passage formed between a proximal end and a flat distal end of the body. The passage is configured for communicating an adhesive supplied at the proximal end to an exit opening in the distal end of the body. A pair of fiber guide channels extend from opposite sides of the central body. Each channel is inclined so that a distal edge of the channel is adjacent a side edge of the distal end of the body, and the channel is formed to guide an optical fiber aligned inside the channel for relative movement over the exit opening of the passage in the distal end of the body during use of the device.

The diameter of the adhesive passage is tapered to narrow from the proximal end of the central body to the exit opening in the flat distal end of the body, so that a dispensing nozzle at a distal end of a syringe containing the adhesive is retained in sealing relationship inside the passage when the central body is urged over the nozzle. Thus, when urged by the syringe, the adhesive flows through the passage and out of the exit opening in the flat distal end of the body to coat the optical fiber when guided over the flat distal end during use of the tool device.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

Figure 1:
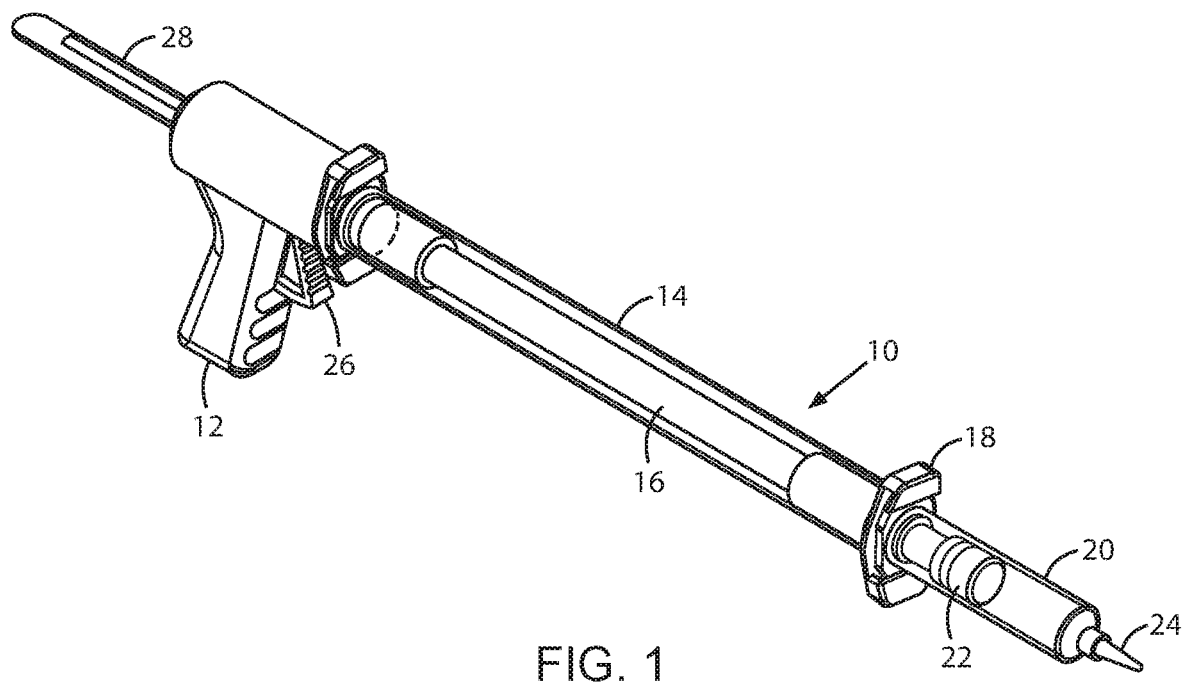
FIG. 1 is an isometric view of an extensible adhesive dispensing gun system.
Figure 2:
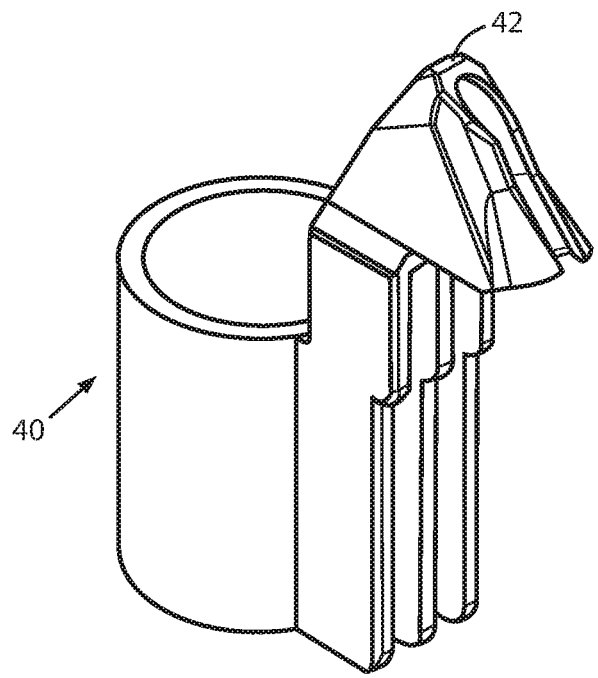
FIG. 2 is an isometric view of a known cord guide tool.
Figure 3:
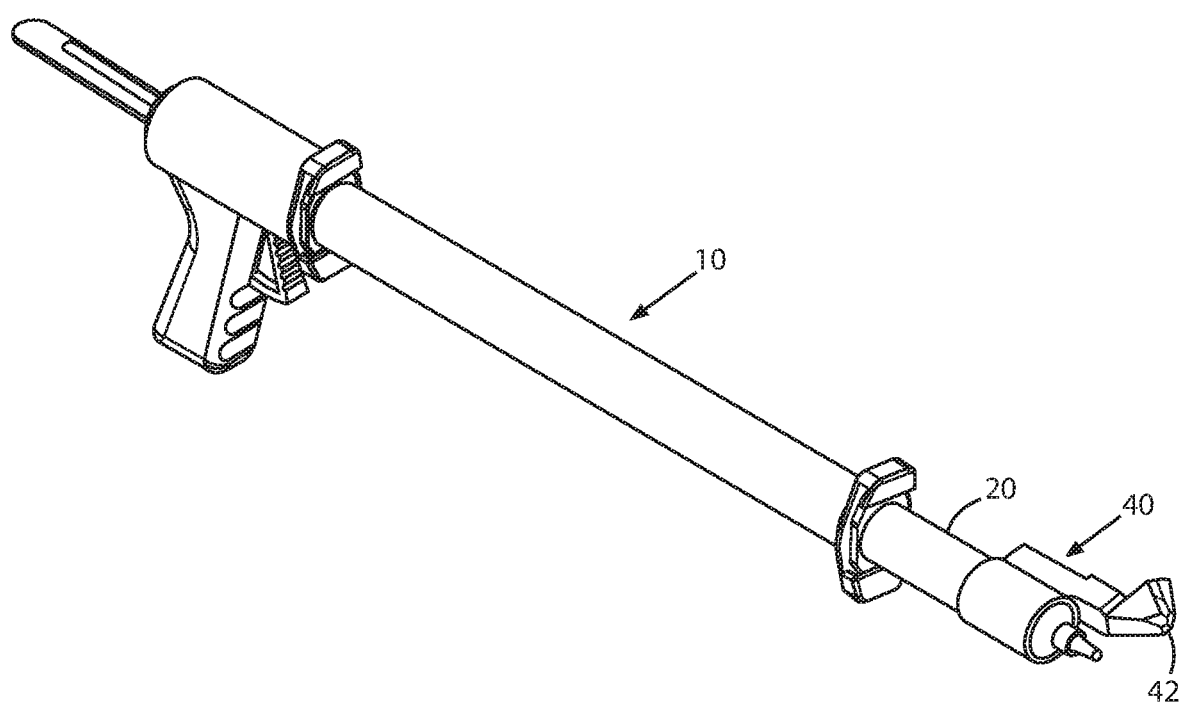
FIG. 3 is a view of the adhesive dispensing gun system in FIG. 1, with the cord guide tool in FIG. 2 coupled to an adhesive syringe at a distal or far end of the system.

To address the earlier mentioned issues concerning installations of 900 μm O.D. buffered fiber in which the fiber is embedded in a deposited adhesive, it has been demonstrated that in addition to reduced weight per unit length of the fiber, the use of a small form factor fiber as defined herein will realize (i) improved resistance to acquiring a permanent set when the fiber is unspooled prior to or during installation, as explained below, and (ii) increased spool density, i.e., a longer length of the fiber can be supplied on a spool of a given size compared to 900 μm fiber.

Specifically, when a spooled 900 μm buffered fiber is unwound, the fiber typically exhibits some memory or set because the elastic limit of the buffer coating, which is often a polymeric material, was exceeded when the fiber was initially wound on the spool. That is, while the fiber is spooled, stresses are induced in the fiber windings which produce corresponding strains within the buffer coating. The stresses vary with the curvature of the windings, being greatest in the windings closest to the hub of the spool. Also, for any given winding, the maximum stress is at the outer circumference of the coating on the winding.

It can be shown that by reducing the outside diameter of a buffered fiber from 900 μm to 600 μm, the maximum stress induced in the buffer coating is reduced by 32.6% if the fiber is wound on a spool having a one-inch diameter hub. Moreover, for a buffered fiber having an O.D. ranging from approximately 400 μm to 700 μm, the maximum stress is reduced by at least 20% when the fiber is wound on a spool hub whose diameter is in the range of about 1.00 to 1.65 inches. Such decreases in the maximum stress will reduce the possibility that a small form factor buffered fiber will exhibit a permanent set when the fiber is unspooled. Also, as discussed earlier, the reduced weight of a small form factor buffered fiber eliminates the need to apply tape over an installed length of the fiber until the adhesive in which the fiber is embedded cures, thus facilitating the overall installation process at the premises and saving valuable time.

Moreover, a small form factor fiber addresses issues related to supply spool density or capacity. When installers arrive at a given premises, they usually do not know the exact dimensions or layout of the premises through which the fiber is to be routed, and where related components such as fiber storage modules and ONTs will be placed. It is therefore important to have enough fiber available for the installers to finish the installation regardless of the premises floor plan, while minimizing the volume needed to store any fiber that remains on the supply spool when the installation is complete.

For a given fiber diameter, the capacity of a supply spool is determined by the radius of the spool hub, the width of the hub, and the height of the spool flanges at the axial ends of the hub. The geometry of the spool is constrained, however, by the space available within a given storage module, and the optical characteristics of the fiber, namely, its bend-loss performance. To ensure optimal aesthetics, low-profile modules such as those available from OFS Fitel, LLC, and known as InvisiLight 80×80 modules, are used. Reducing the outer diameter of the fiber 900 μm to 600 μm will therefore more than double the capacity of a given supply spool, and allow a longer length of the fiber to be deployed on a low-profile spool that can be stored inside the mentioned 80×80 or other low-profile module.

Yet another advantage of using of a small form factor buffered fiber is that the reduced diameter of the fiber makes it less visible than standard 900 μm fiber when installed. The reduced visibility will result in a more aesthetically pleasing installation.

In accordance with the invention, a small form factor buffered fiber, for example, the commercially available 600 μm O.D. fiber identified above, is embedded and retained in an adhesive while the adhesive is being deposited over a desired path inside a user premises, without a need for a ladder. The installation is performed using either one of two fiber guide tool devices 50, 150 which are shown in FIGS. 4 to 13 of the present application and described below. The tool devices 50, 150 are constructed and arranged to deposit the adhesive over the desired path while simultaneously embedding the fiber in the adhesive. As a result, the time required to finish an aesthetically pleasing fiber installation at the premises is substantially reduced.

Figure 4A:
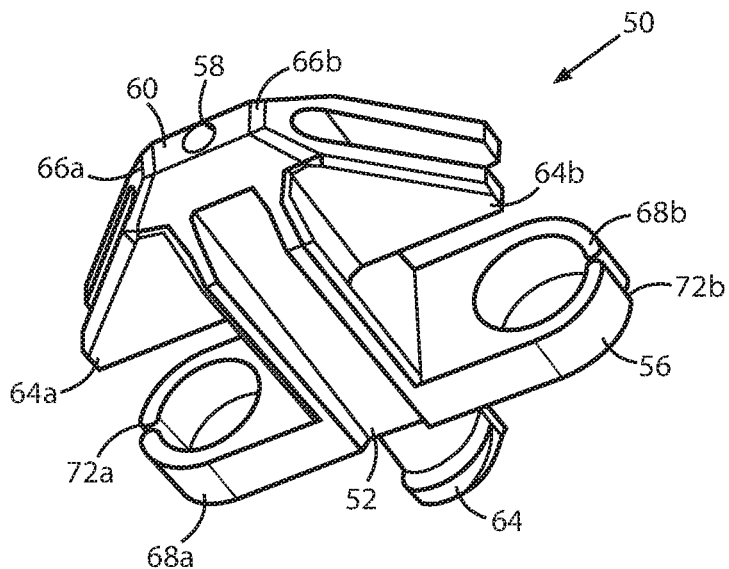
FIG. 4A is an isometric view of a first embodiment of a fiber guide tool device according to the invention.
Figure 4B:
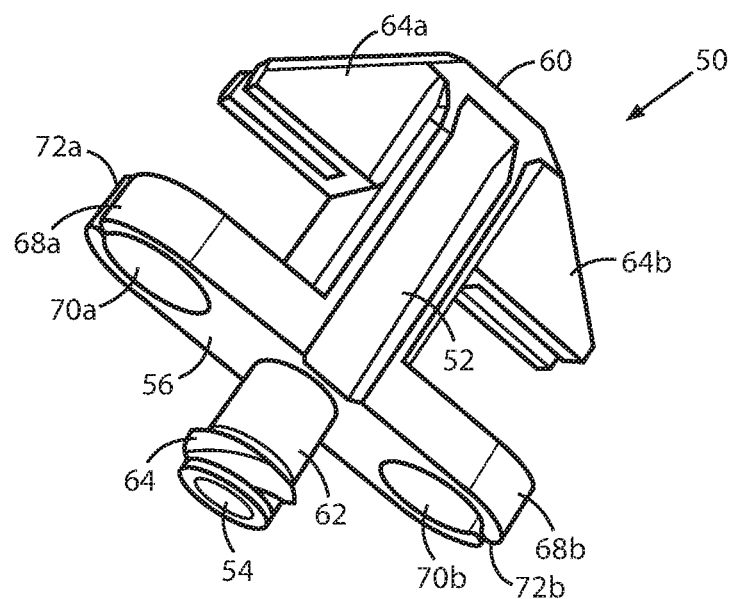
FIG. 4B is an isometric view of the fiber guide tool device in FIG. 4A, as taken from beneath the device.

In a first embodiment illustrated in FIGS. 4A and 4B, guide tool device 50 is integrally formed, for example and without limitation, by injection molding of Nylon 6, polypropylene, or an equivalent thermoplastic material. The tool device 50 includes an elongated central body 52 having a generally rectangular cross section, and an elongated adhesive passage 54 is formed in the body between a proximal end 56 and a flat distal end 60 of the body 52. The passage 54 is configured to communicate an adhesive that is supplied through a cylindrical boss 62 extending axially from the proximal end 56, to an exit opening 58 on the flat distal end 60 of the body 52.

Figure 5A:
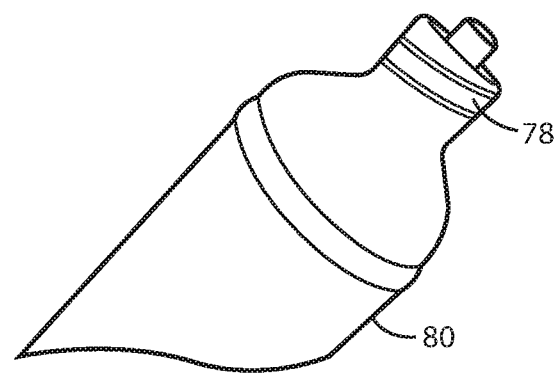
FIG. 5A shows a distal end of an adhesive syringe to which the guide tool device can be joined, according to the invention.
Figure 5B:
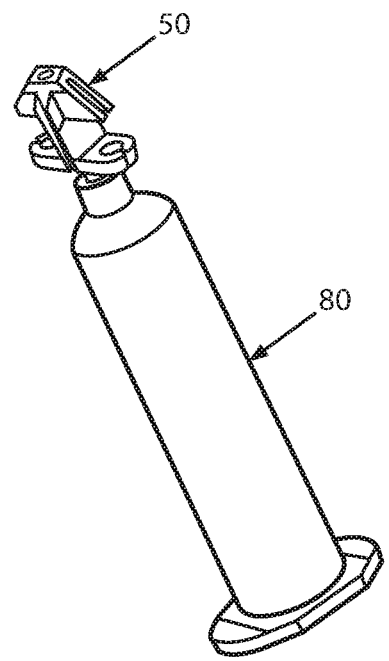
FIG. 5B shows the guide tool device when joined to the distal end of the syringe in FIG. 5A.

A conventional Luer-lock connector 64 is fixed on the open end of the boss 62. The connector 64 is configured to attach the tool device 50 to a mating Luer connector 78 that is provided at a distal end of a syringe 80 such as shown in FIG. 5A and which is filled with a desired adhesive. The syringe 80 is commercially available with Luer connector 78 from, e.g., Nordson EFD. FIG. 5B shows the tool device 50 attached to the distal end of the syringe 80.

The guide tool device 50 also has a pair of fiber guide channels 64a, 64b extending from opposite sides of the central body 52 of the device, wherein a distal end of each channel is inclined at an angle of approximately 43 degrees from the horizontal. See FIG. 7. Distal edges 66a, 66b of the channels 64a, 64b are adjacent to corresponding side edges of the flat distal end 60 of the body 52, and the channel edges 66a, 66b are preferably rounded at a radius of, e.g., 0.05 inch. Accordingly, when an optical fiber is aligned inside one of the channels 64a, 64b after a free end of the fiber is anchored at a given point along an installation path, and the tool device 50 is swept from the anchor point in the direction of the path, the fiber is guided through the channel for relative movement over the opening 58 of the adhesive passage 54 in flat distal end 60 of the device body 52. See FIGS. 12 and 13. It will also be understood that by constructing the two fiber guide channels 64a, 64b in opposed relation to one another along the central body 52, the tool device 50 can be used to route a fiber in either direction along an installation path without having to remove and reposition the device along the path.

Guide tool device 50 further includes a pair of fiber retaining lugs 68a, 68b extending from opposite sides of the central body 52, below the fiber guide channels 64a, 64b. Each lug 68a, 68b has an opening 70a, 70b aligned beneath a corresponding one of the fiber guide channels 64a, 64b for passing an optical fiber from, e.g., a supply spool, to enter the corresponding guide channel while the tool device 50 is being used. The wall of each retaining lug 68a, 68b has an axial slot at 72a, 72b through which a fiber can be urged sideways into the lug opening. By making the width of each slot 72a, 72b slightly smaller than the O.D. of the fiber, the fiber will stay confined within either lug opening during use of the tool device 50.

Figure 6A:
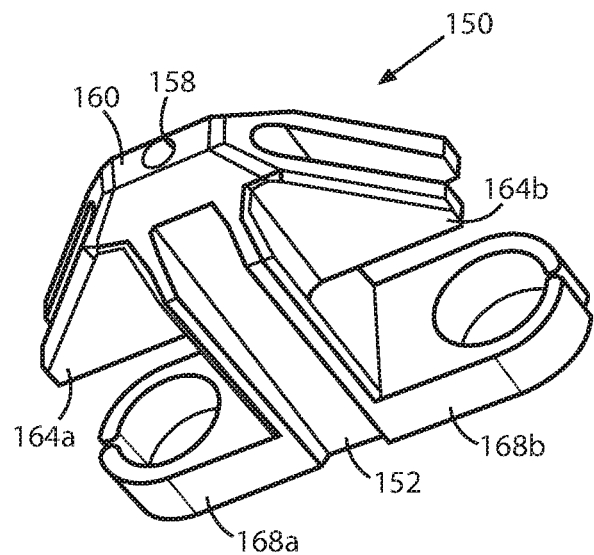
FIG. 6A is an isometric view of a second embodiment of a fiber guide tool device according to the invention.
Figure 6B:
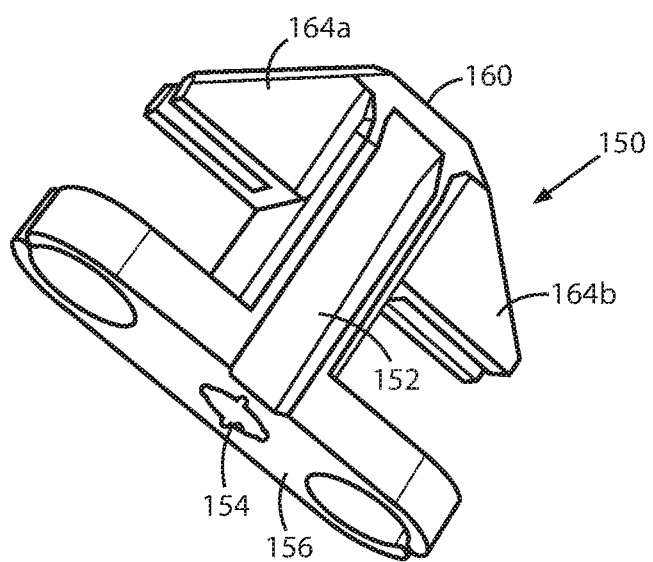
FIG. 6B is an isometric view of the fiber guide tool device in FIG. 6A, as taken from beneath the device.

Typical dimensions for the fiber guide tool device 50 are, without limitation:
Width between outside ends of retaining lugs 68a, 68b: 1.3 inches.
Height including boss 62: 1.3 inches.
Height between proximal end 56 and flat distal end 60 of the device (excluding boss 62): 1.0 inch.
Width of flat distal end 60 of the device: 0.11 inch.
Length of flat distal end 60 of the device: 0.3 inch FIGS. 6A and 6B show another embodiment of a fiber guide tool device 150 according to the invention. Features of the tool device 150 that correspond to those of the tool device 50 described above, have corresponding reference numbers increased by 100.

Guide tool device 150 is constructed and arranged for attachment onto a commercially available dispensing nozzle 172 having a Luer-lock connector at the base of the nozzle, after the nozzle 172 is connected to the mating connector at the distal end of the syringe 180. See FIGS. 8A and 8B.

Figure 7:
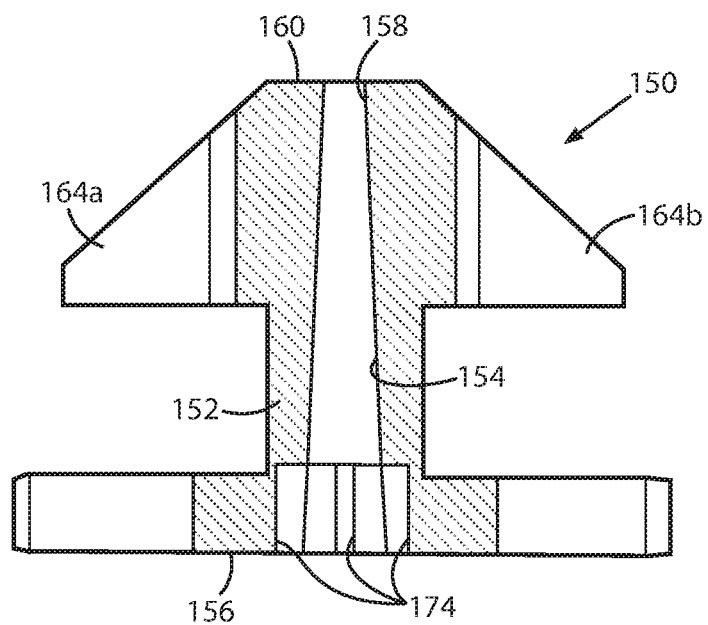
FIG. 7 is an enlarged, cross-sectional view of the guide tool device in FIGS. 6A and 6B, showing an axial through passage inside the device.
Figure 8A:
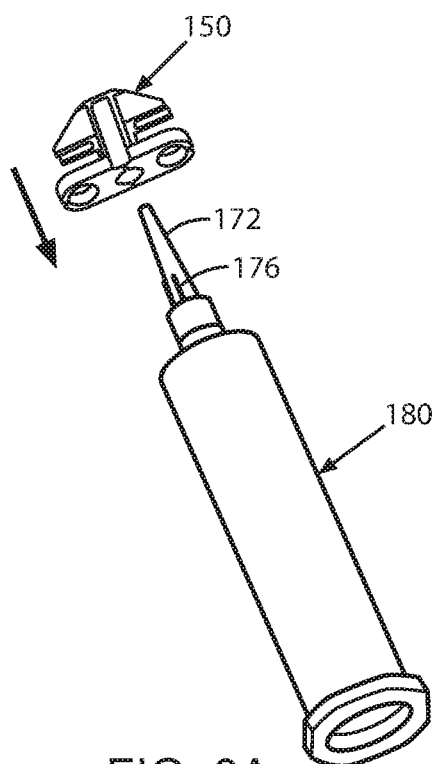
FIG. 8A shows the second embodiment of the guide tool device aligned with an adhesive dispensing nozzle at the distal end of the syringe in FIG. 5A, according to the invention.
Figure 8B:
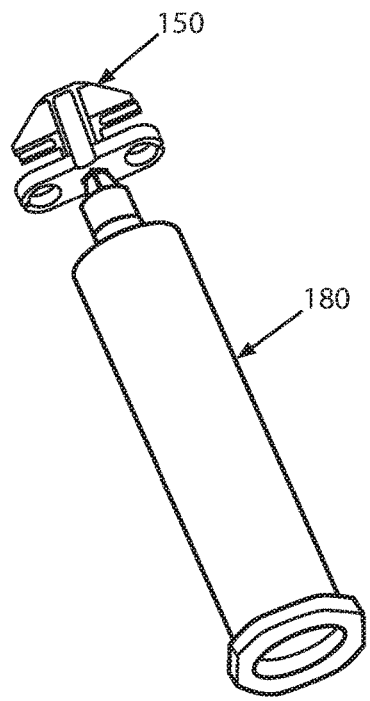
FIG. 8B shows the guide tool device and the nozzle in FIG. 8A when operatively joined to one another.

FIG. 7 is a cross-sectional view of the guide tool device 150. The central body 152 of the tool device 150 has an adhesive thru passage 154 the diameter of which is tapered to narrow from the proximal end 156 of the body 152 to the exit opening 158 in flat distal end 160 of the body. In particular, the passage 154 is configured so that the tip of the nozzle 172 can enter the passage 154 at the proximal end 156 of the tool device 150, and the nozzle 172 is retained in sealing relationship (e.g., by friction) inside the passage 154 when the central body 152 is urged over the nozzle as depicted in FIGS. 8A and 8B.

The central body 152 of the tool device 150 also has a number of parallel, axially directed keyways 174 surrounding the opening of the thru passage 154 at the proximal end 156 of the body 152. The keyways 174 are located and sized to receive a corresponding number of keys or ribs 176 that are formed about the base of the dispensing nozzle 172 on the adhesive syringe 180, as shown in FIG. 8A. Accordingly, when the central body 152 of the tool device 150 is urged over the nozzle 172, the ribs 176 at the base of the nozzle are received in the keyways 174 and will prevent the tool device 150 from rotating freely about the nozzle, thereby facilitating proper alignment of the tool device 150 relative to a dispensing gun system in which the device 150 is deployed.

Figure 9:
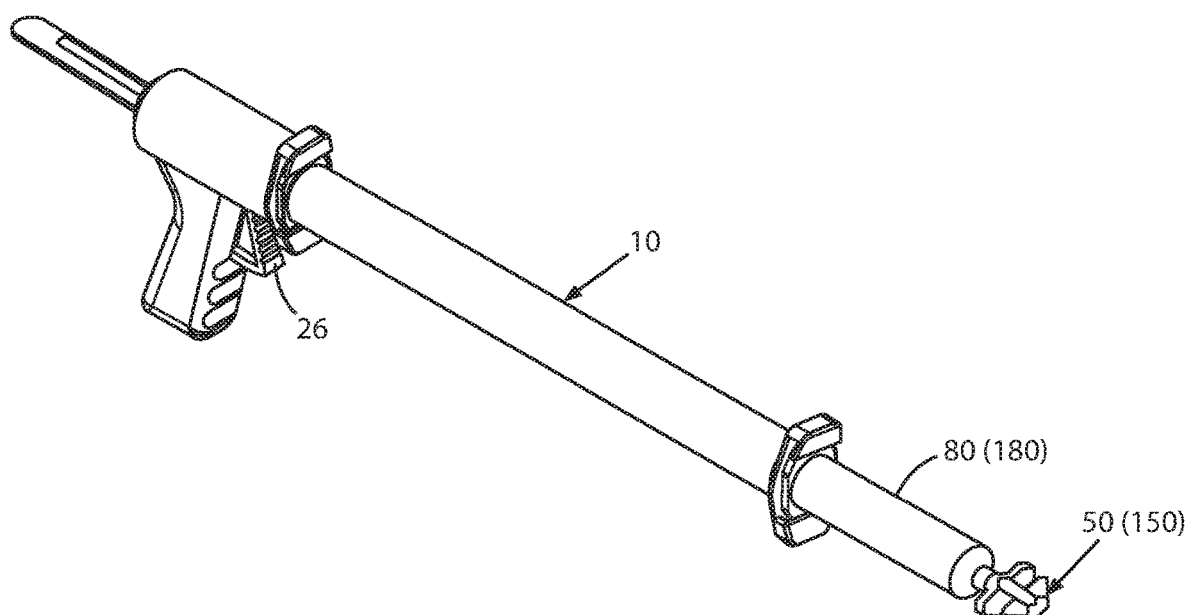
FIG. 9 shows the syringe in FIG. 5A mounted at the distal end of the adhesive dispensing gun system in FIG. 1, with either embodiment of the guide tool device operatively joined to the syringe.

When either one of the guide tool devices 50 or 150 is connected to receive an adhesive supplied from the adhesive syringe 80 or 180 as described above, and the device is deployed at the distal end of the extensible adhesive dispensing gun system 10 as shown in FIG. 9, an installer can deposit the adhesive with an embedded fiber along elevated structural corners between, e.g., adjacent walls, a wall and a ceiling, or a wall and a molding at a premises, without needing a ladder.

Specifically, the flat distal ends 60, 160 of the central bodies 52, 152 of the tool devices are sized and formed so that when urged against and swept along structural corners, the space formed between the distal ends and the corners is relatively small. Thus, as the adhesive is dispensed out from the exit openings 58, 158 at the distal ends 60, 160 of the device bodies, the adhesive is coated onto the fiber within the confines of the small space between the distal ends and the corners along which the devices are swept. As a result, the fiber is embedded neatly and precisely within the adhesive at the same time the adhesive is deposited in the corners by the tool devices.

Figure 10:
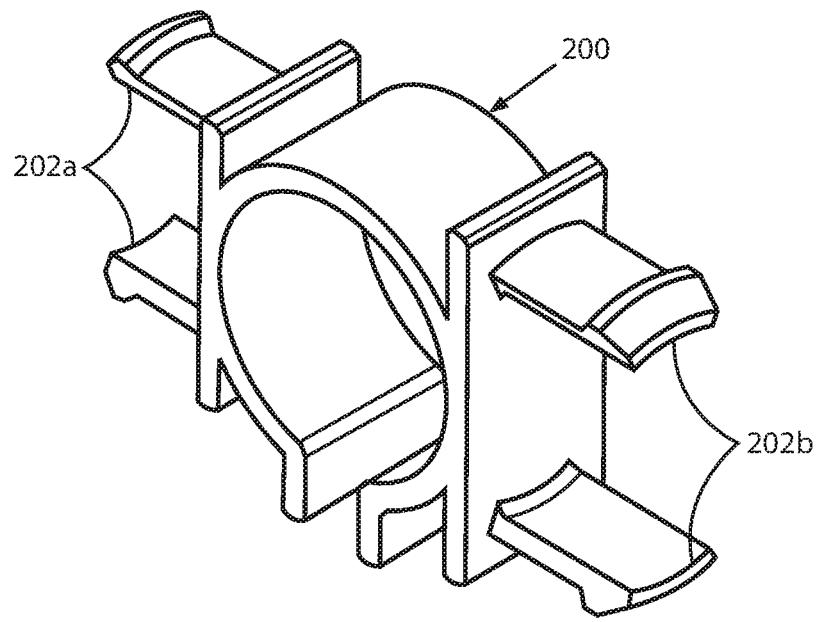
FIG. 10 shows a clip for retaining a fiber supply spool at a proximal end of the dispensing gun system shown in FIG. 9.
Figure 11:
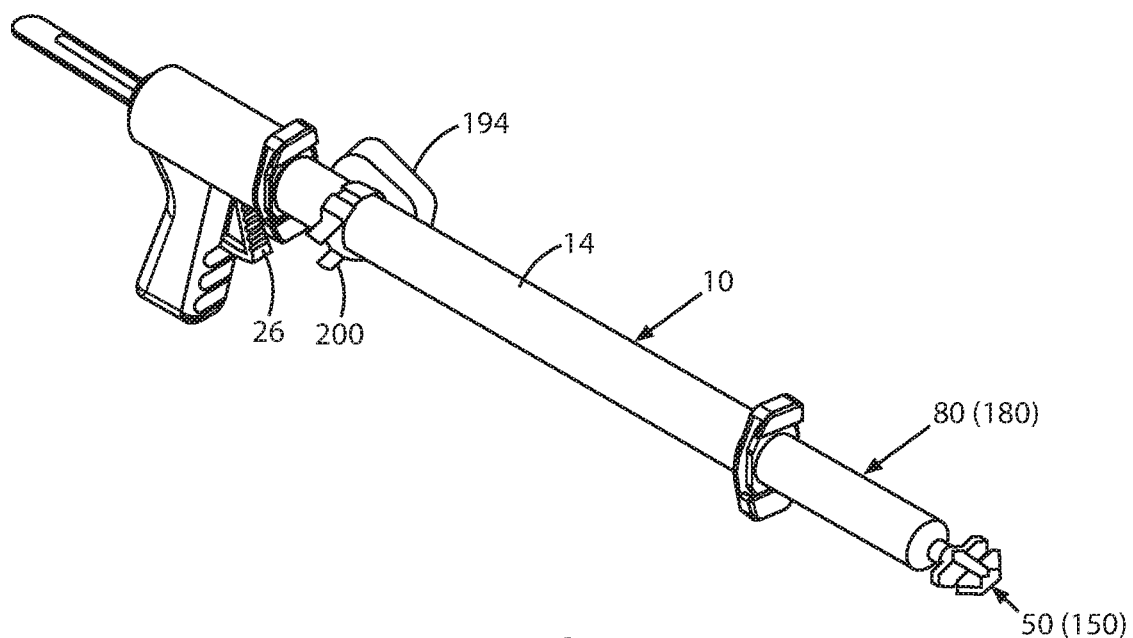
FIG. 11 shows the clip in FIG. 10 mounted on the dispensing gun system in FIG. 9, with a fiber supply spool retained for rotation about the clip.
Figure 12:
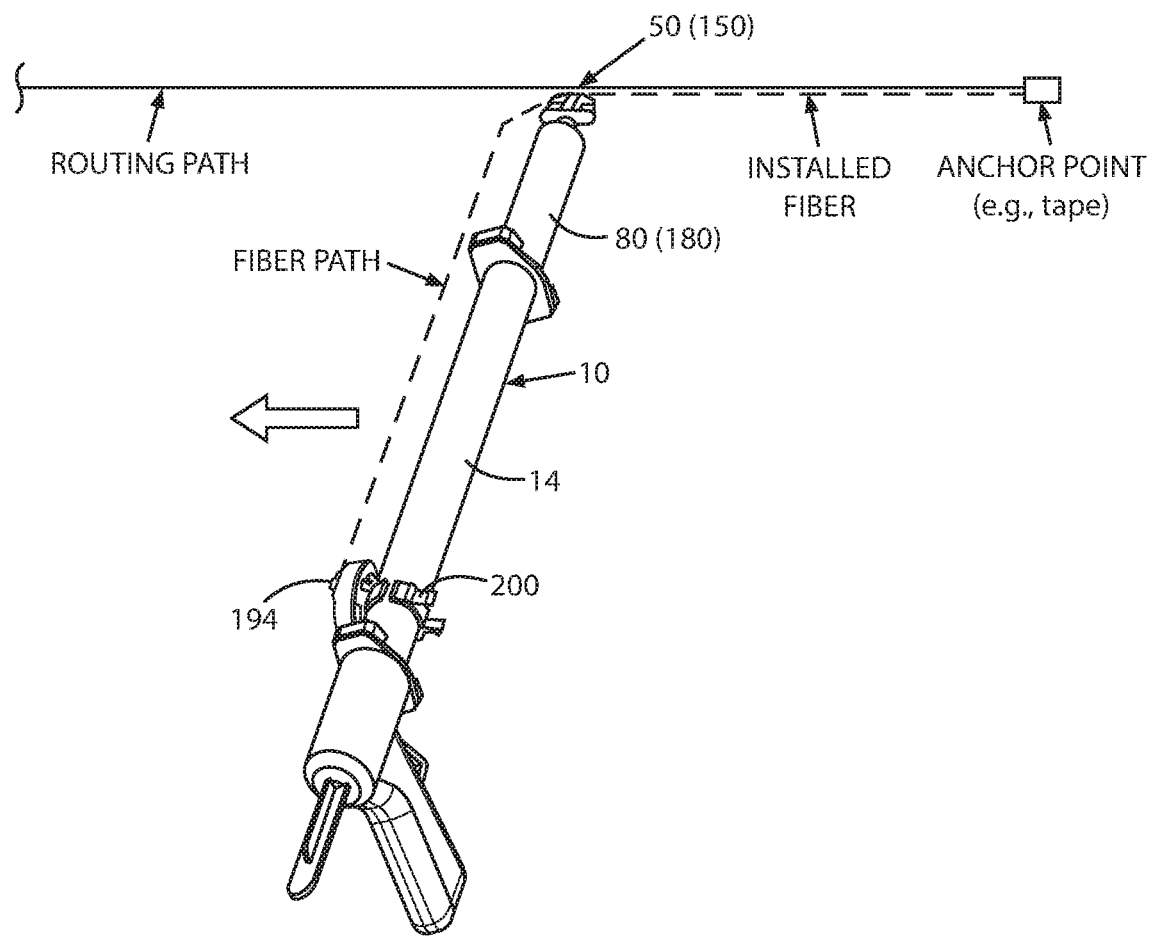
FIG. 12 illustrates the path of a fiber from the supply spool when the system in FIG. 11 deposits an adhesive with the fiber along a routing path at a user premises.

FIG. 10 shows a generally C-shaped spool retention clip 200 having two pairs of spool retaining fingers 202a, 202b extending radially from opposite positions along the circumference of the clip. Each pair of fingers is sized to receive and support the hub of a fiber supply spool 194 (see FIGS. 11 and 12) while allowing the spool to rotate freely around its axis. One pair of fingers (e.g., 202a) is sized for a low-profile supply spool, and the opposing pair (e.g., 202b) is sized for larger, high-capacity supply spools. The clip 200 may be made of plastics or an equivalent resilient material so it can be opened and mounted firmly by friction on the circumference of the outer tube 14 of the dispensing gun system 10, near the proximal end of the system 10 as shown in FIGS. 11 and 12. That is, the inside diameter of the clip 200 is less than the outside diameter of the outer tube 14 of the system so that the clip 200 is restrained from movement relative to the tube 14 once the clip is placed as desired.

Figure 13:
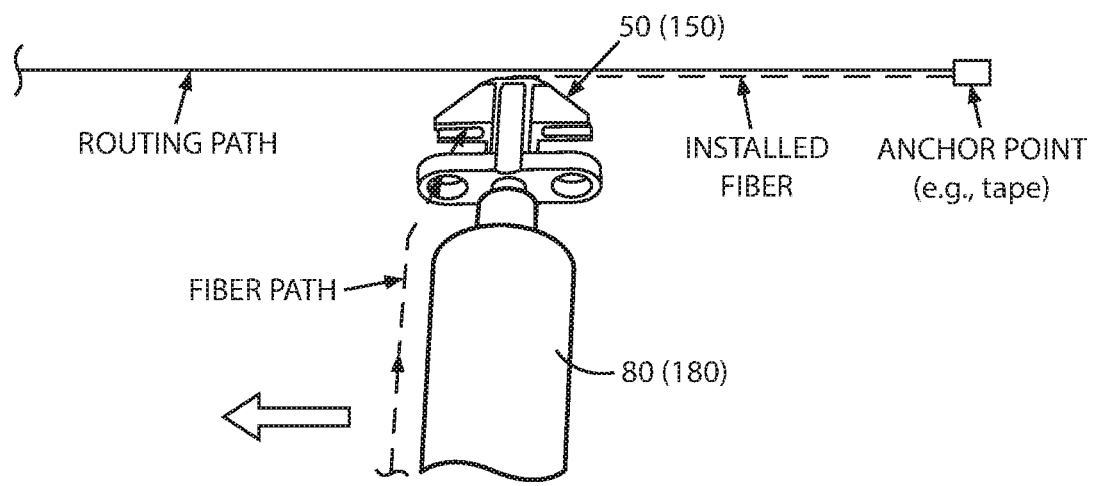
FIG. 13 is an enlarged view showing the path of the fiber through the guide tool device in FIG. 12.

FIG. 11 shows the spool retention clip 200 positioned on the outer tube 14 of the dispensing gun system 10, with the fiber supply spool 194 conveniently attached. FIG. 12 illustrates the path (in dashed lines) of the fiber from the mounted spool 194, through one of the guide channels 64a, 64b (or 164a, 164b) of the tool device mounted at the far end of the dispensing gun system 10, and along an elevated routing path while the tool device is swept along the path by an installer. FIG. 13 is an enlarged view of the guide tool device 50 (or 150) at the distal end of the adhesive syringe 80 (or 180) in FIG. 12, showing the path taken by the fiber from the supply spool to the tool device as the tool device is being used.

As mentioned earlier, in order for the inventive tool device 50 (or 150) to work reliably, a small form factor fiber as defined herein and which is light enough to remain securely embedded within a previously deposited but yet uncured adhesive, is preferred. The use of such fiber will avoid a situation wherein the weight of an uninstalled length of fiber left hanging from the end of a recently installed fiber, causes the installed fiber to peel away before the adhesive in which the fiber is embedded is fully cured. Uninstalled lengths of fiber are commonly left hanging if an installer must pause the installation process on account of, e.g., unplanned interruptions, restroom breaks, phone calls, and the like.

Example One

An example of a procedure for installing a supplied fiber along an elevated routing path using the guide tool device 50, is described below. Steps listed below are intended to be exemplary only, and not to limit the scope of the invention.

1. If present, remove a cap from the distal end of the adhesive syringe 80 when mounted at the far end of the adhesive dispensing gun system 10 in FIG. 11.

2. Attach the tool device to the distal end of the adhesive syringe 80 by twisting Luer-lock connector 64 at the proximal end of the device into the mating connector on the syringe.

3. Place the spool retention clip 200 on the dispensing gun system 10, and mount the fiber supply spool 194 for rotation on the retention clip.

4. Unspool enough length of fiber to establish an anchor point at a desired starting position along the routing path at the premises, and fasten an end of the fiber to the anchor point using tape.

5. Place the unspooled length of fiber into the fiber guide channel (64a or 64b) that faces in the direction in which the tool device 50 will be swept in FIGS. 12 and 13. Then gently slide the tool device upward along the fiber until the tool device is at the anchor point.

6. Position the tool device 50 as needed to ensure the flat distal end 60 on the body of the device maintains contact with the structural corner along which the distal end will be swept.

7. Pull the trigger 26 of the dispensing gun system 10 slowly and repeatedly as needed to dispense the adhesive out from the opening 58 in the distal end 60 of the device body to coat the fiber, while sweeping the tool device 50 along the routing path to deposit the adhesive while simultaneously embedding the fiber in the adhesive.

Example Two

An example of a procedure for installing a supplied fiber along an elevated routing path using the guide tool device 150, is described below. Steps listed below are intended to be exemplary only, and not to limit the scope of the invention.

1. If present, remove a cap from the distal end of the adhesive syringe 180 when mounted at the far end of the adhesive dispensing gun system 10 in FIG. 11.

2. Attach the nozzle 172 to the distal end of the syringe 180 by twisting the connector at the base of the nozzle into the mating connector on the syringe.

3. Attach the guide tool device 150 to the adhesive syringe 180 by aligning the keyways 174 in the proximal end of the device 150, with the keys 176 at the base of the syringe nozzle 172, and press fit the tool device 150 over the nozzle.

4. Place the spool retention clip 200 on the dispensing gun system 10, and mount the fiber supply spool for rotation on the retention clip.

5. Unspool enough fiber to establish an anchor point at a desired starting point along the routing path.

6. Place the unspooled length of fiber into the fiber guide channel (164a or 164b) that faces in the direction in which the tool device 150 will be swept in FIGS. 12 and 13. Then gently slide the tool device upward along the fiber until the tool device is at the anchor point.

7. Position the tool device 150 as needed to ensure the flat distal end 160 on the body of the device maintains contact with the structural corner along which the distal end will be swept.

8. Pull the trigger 26 of the dispensing gun system 10 slowly and repeatedly as needed to dispense the adhesive out from the opening 158 in the distal end 160 of the device body to coat the fiber, while sweeping the tool device 150 along the routing path to deposit the adhesive while simultaneously embedding the fiber in the adhesive.

As disclosed herein, the inventive fiber guide tool devices 50, 150 operate to deposit an adhesive over a defined routing path at a user premises including exposed elevated corners that would ordinarily require a ladder to reach, while at the same time embedding a supplied fiber in the adhesive. The fiber is guided over an opening in a flat distal end of the body of the device, so that the fiber is coated with the adhesive which is dispensed out of the opening. As an installer urges the device against and sweeps the device along the corner, the flat distal end of the device body works to deposit the dispensed adhesive in the corner together with the fiber which is embedded in the adhesive.

Excess adhesive is also accumulated and removed by the flat distal ends 60, 160 of the tool devices, thereby depositing a straight and neat adhesive strip in which the fiber becomes firmly embedded when the adhesive cures. Because fewer if any ladder moves are required, the overall time needed to install an optical fiber when using either one of the tool devices 50, 150 is significantly reduced.

While the foregoing represents preferred embodiments of the present invention, it will be understood by persons skilled in the art that various changes, modifications, and additions can be made without departing from the spirit and scope of the invention, and that the invention includes all such changes, modifications, and additions that are within the scope of the following claims.

We claim:

1. A guide tool device for an optical fiber or cord, comprising:

an elongated central body having an elongated adhesive passage formed between a proximal end and a flat distal end of the body, wherein the passage is configured for communicating an adhesive supplied at the proximal end to an exit opening of the passage in the flat distal end of the body;

a pair of fiber guide channels extending from opposite sides of the central body, wherein each channel has a distal edge adjacent to a corresponding side edge of the flat distal end of the body, and the channel is formed to guide an optical fiber aligned inside the channel for relative movement over the exit opening of the adhesive passage in the flat distal end during use of the tool device; and a first connector fixed on the proximal end of the central body in communication with the adhesive passage in the body, wherein the first connector is configured to mate in sealing relationship with a second connector at the distal end of a syringe containing the adhesive, so that the adhesive flows through the passage and out of the exit opening in the flat distal end of the body for coating the optical fiber when guided over the flat distal end during use of the tool device.

2. A guide tool device according to claim 1, including a pair of fiber retaining lugs extending from opposite sides of the central body and below corresponding ones of the fiber guide channels, wherein each one of the retaining lugs is constructed and arranged for passing the optical fiber through a lug opening to enter the corresponding guide channel during use of the tool device.

3. A guide tool device according to claim 2, wherein each one of the retaining lugs has a slot formed through a wall of the lug, so that the optical fiber can be urged sideways to enter the lug opening.

4. A guide tool device according to claim 1, wherein the first connector is a Luer type connector.

5. A guide tool device according to claim 1, wherein distal ends of the guide channels are inclined at an angle of approximately 43 degrees with respect to the horizontal.

6. A guide tool device according to claim 1, wherein the height of the device between the proximal and the flat distal end of the central body is approximately one inch.

7. A guide tool device according to claim 1, wherein the flat distal end of the central body has a width of approximately 0.11 inch.

8. A guide tool device according to claim 1, wherein the flat distal end of the central body has a length of approximately 0.3 inch.

9. A guide tool device according to claim 1, including a cylindrical boss extending axially from the proximal end of the central body, and the first connector is fixed on the open end of the boss.

10. A system for installing an optical fiber along a desired routing path at a user premises, comprising:
an extensible adhesive dispensing gun system including:
a dispensing gun;
an outer tube extending from an end of the gun;
an inner rod extending axially inside the outer tube, wherein the rod is arranged to advance in the axial direction by operation of the dispensing gun; and
an adhesive syringe mounted at a distal end of the outer tube, the syringe including a piston for dispensing an adhesive contained in the syringe from a distal end of the syringe when the rod inside the outer tube is advanced; and
a guide tool device according to claim 1;
wherein the adhesive syringe includes the second connector at the distal end of the syringe, and the first connector at the proximal end of the guide tool device is connected to the second connector at the end of the syringe.

11. A system for installing an optical fiber according to claim 10, including
a spool retention clip configured for mounting on the circumference of the outer tube of the adhesive dispensing gun system, wherein the clip has one or more spool retaining fingers;
a supply spool containing a fiber to be installed at the user premises, and the spool has a hub dimensioned to be supported for rotation about the retaining fingers of the spool retention clip; and
the supply spool contains a small form factor fiber.

12. A guide tool device for an optical fiber or cord, comprising:
an elongated central body having an elongated adhesive passage formed between a proximal end and a flat distal end of the body, wherein the passage is configured for communicating an adhesive supplied at the proximal end to an exit opening of the passage in the flat distal end of the body;
a pair of fiber guide channels extending from opposite sides of the central body, wherein each channel has a distal edge adjacent to a corresponding side edge of the flat distal end of the body, and the channel is formed to guide an optical fiber aligned inside the channel for relative movement over the exit opening of the adhesive passage in the flat distal end during use of the tool device; and
the diameter of the adhesive passage is tapered to narrow from the proximal end of the central body to the exit opening in the flat distal end of the body, so that a dispensing nozzle at a distal end of a syringe containing the adhesive is retained in sealing relationship inside the passage when the central body is urged over the nozzle, and the adhesive flows through the passage and out of the exit opening in the flat distal end of the body for coating the optical fiber when guided over the flat distal end during use of the tool device.

13. A guide tool device according to claim 12, including a pair of fiber retaining lugs extending from opposite sides of the central body and below corresponding ones of the fiber guide channels, wherein each one of the retaining lugs is constructed and arranged for passing the optical fiber through a lug opening to enter the corresponding guide channel during use of the tool device.

14. A guide tool device according to claim 12, wherein the height of the device between the proximal and the flat distal end of the central body is approximately one inch.

15. A guide tool device according to claim 12, wherein distal ends of the guide channels are inclined at an angle of approximately 43 degrees with respect to the horizontal.

16. A guide tool device according to claim 13, wherein each one of the retaining lugs has a slot formed through a wall of the lug, so that the optical fiber can be urged sideways to enter the lug opening.

17. A guide tool device according to claim 12, wherein the flat distal end of the central body has a width of approximately 0.11 inch.

18. A guide tool device according to claim 12, wherein the flat distal end of the central body has a length of approximately 0.3 inch.

19. A system for installing an optical fiber along a desired routing path at a user premises, comprising:
an extensible adhesive dispensing gun system including:
a dispensing gun;
an outer tube extending from an end of the gun;
an inner rod extending axially inside the outer tube, wherein the rod is arranged to advance in the axial direction by operation of the dispensing gun; and
an adhesive syringe mounted at a distal end of the outer tube, the syringe including a piston for dispensing an adhesive contained in the syringe from a distal end of the syringe when the rod inside the outer tube is advanced; and
a guide tool device according to claim 12;
wherein the adhesive syringe includes the dispensing nozzle at the distal end of the syringe, and the nozzle is retained in sealing relationship inside the passage in the central body of the guide tool device.

20. A system for installing an optical fiber according to claim 19, including
a spool retention clip configured for mounting on the circumference of the outer tube of the adhesive dispensing gun system, wherein the clip has one or more spool retaining fingers;
a supply spool containing a fiber to be installed at the user premises, and the spool has a hub dimensioned to be supported for rotation about the retaining fingers of the spool retention clip; and
the supply spool contains a small form factor fiber.

* * * * *